United States Patent
Kawai

(10) Patent No.: US 11,658,106 B2
(45) Date of Patent: May 23, 2023

(54) ELECTRONIC DEVICE, ELECTRONIC APPARATUS, AND METHOD FOR SUPPORTING DESIGN OF ELECTRONIC DEVICE

(71) Applicant: FUJITSU LIMITED, Kawasaki (JP)

(72) Inventor: Kenichi Kawai, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 270 days.

(21) Appl. No.: 17/183,405

(22) Filed: Feb. 24, 2021

(65) Prior Publication Data

US 2021/0183759 A1 Jun. 17, 2021

Related U.S. Application Data

(63) Continuation of application No. PCT/JP2018/034611, filed on Sep. 19, 2018.

(51) Int. Cl.
*H05K 1/18* (2006.01)
*H01L 23/498* (2006.01)
(Continued)

(52) U.S. Cl.
CPC ...... *H01L 23/49838* (2013.01); *G06F 30/394* (2020.01); *H01L 23/642* (2013.01);
(Continued)

(58) Field of Classification Search
CPC .............. H05K 1/18; H05K 1/181–187; H01L 23/49822; H01L 23/49816;
(Continued)

(56) References Cited

U.S. PATENT DOCUMENTS 7,185,799 B2 * 3/2007 Pearson ................. H01L 23/50
257/E23.079
8,208,268 B2 * 6/2012 Kajiki ..................... H05K 1/144
361/767
(Continued)

FOREIGN PATENT DOCUMENTS

JP 2004-6488 A 1/2004
JP 2007-13063 A 1/2007
(Continued)

OTHER PUBLICATIONS

European Office Action dated Mar. 25, 2022 for corresponding European Patent Application No. 18933785.0, 5 pages. *Please note US-2018/0184524-A1 cited herewith, was previously cited in an IDS filed on Jan. 26, 2022.*.
(Continued)

*Primary Examiner* — Tuan T Dinh
(74) *Attorney, Agent, or Firm* — Fujitsu Patent Center

(57) ABSTRACT

An electronic device includes: a board that includes an insulating film, a wiring layer and a via provided in the insulating film, and a plurality of power source pads and a plurality of ground pads which are provided in the insulating film so as to surround a capacitor region in which a capacitor is provided and to which a plurality of bumps is coupled; and an electronic component that is mounted at the board, and is electrically coupled to the plurality of power source pads and the plurality of ground pads through the wiring layer and the via. Further, a method for supporting design of the electronic device is provided.

10 Claims, 16 Drawing Sheets

(51) Int. Cl.
  *G06F 30/394* (2020.01)
  *H01L 23/64* (2006.01)
  *G06F 115/12* (2020.01)

(52) U.S. Cl.
  CPC .......... *H05K 1/181* (2013.01); *G06F 2115/12* (2020.01); *H01L 23/49816* (2013.01); *H01L 23/49822* (2013.01); *H05K 2201/10015* (2013.01); *H05K 2201/10378* (2013.01); *H05K 2201/10515* (2013.01)

(58) Field of Classification Search
  CPC ... H01L 23/49836; H01L 23/62; H01L 23/64; H01L 23/145
  USPC .................................. 361/767–778, 790–795
  See application file for complete search history.

(56) References Cited

U.S. PATENT DOCUMENTS

| | | |
|---|---|---|
| 2003/0222356 A1 | 12/2003 | Kinoshita |
| 2004/0090758 A1* | 5/2004 | Horikawa ......... H01L 23/49822 257/691 |
| 2005/0162839 A1 | 7/2005 | Chan et al. |
| 2005/0218502 A1* | 10/2005 | Sunohara ................ H01L 23/50 257/E23.079 |
| 2006/0083895 A1* | 4/2006 | Ikeda ....................... B32B 3/10 257/E23.079 |
| 2006/0103004 A1 | 5/2006 | Sakai et al. |
| 2007/0001317 A1 | 1/2007 | Matsuoka et al. |
| 2010/0263913 A1 | 10/2010 | Daubenspeck et al. |
| 2012/0057261 A1* | 3/2012 | Poulton ................... H04B 3/56 327/87 |
| 2016/0095218 A1* | 3/2016 | Sakurai .................. H05K 3/426 361/768 |
| 2016/0143140 A1* | 5/2016 | Chang .................... H05K 1/111 174/262 |
| 2018/0168039 A1* | 6/2018 | Numagi ........... H01L 23/49838 |
| 2018/0184524 A1 | 6/2018 | Xiong |

FOREIGN PATENT DOCUMENTS

| | | |
|---|---|---|
| JP | 2010-251754 A | 11/2010 |
| JP | 2013-62309 A | 4/2013 |

OTHER PUBLICATIONS

International Search Report and Written Opinion of the International Searching Authority (Form PCT/ISA/210, 220, and 237), mailed in connection with PCT/JP2018/034611 and dated Nov. 20, 2018 (Total 8 pages).

Extended European Search Report dated Nov. 8, 2021 for European Patent Application No. 18933785.0, 5 pages.

* cited by examiner

UNIT [A]

ELECTRONIC DEVICE, ELECTRONIC APPARATUS, AND METHOD FOR SUPPORTING DESIGN OF ELECTRONIC DEVICE

CROSS-REFERENCE TO RELATED APPLICATION

This application is a continuation application of International Application PCT/JP2018/034611 filed on Sep. 19, 2018 and designated the U.S., the entire contents of which are incorporated herein by reference.

FIELD

The embodiments discussed herein are related to an electronic device, an electronic apparatus, and a method for supporting a design of an electronic device.

BACKGROUND

A method for coupling boards to each other by a bump such as a solder ball has been known. A method for improving uniformity of a current density in the solder ball by setting an area density of a via to be higher in a central region of a pad than in a peripheral region thereof so as to suppress formation of a void in the solder ball due to electromigration has been known.

Related art is disclosed in Japanese Laid-open Patent Publication No. 2010-251754.

SUMMARY

According to one aspect of the embodiments, an electronic device includes: a board that includes an insulating film, a wiring layer and a via provided in the insulating film, and a plurality of power source pads and a plurality of ground pads which are provided in the insulating film so as to surround a capacitor region in which a capacitor is provided and to which a plurality of bumps is coupled; and an electronic component that is mounted at the board, and is electrically coupled to the plurality of power source pads and the plurality of ground pads through the wiring layer and the via, wherein at least one of a case where the plurality of power source pads includes one or a plurality of first power source pads with which the via is in contact and one or a plurality of second power source pads of which a total area in contact with the via is smaller than a total area of the one or plurality of first power source pads in contact with the via in a column lined up along a side of an outline of the capacitor region so as to be adjacent to the capacitor region and a case where the plurality of ground pads includes one or a plurality of first ground pads with which the via is in contact and one or a plurality of second ground pads of which a total area in contact with the via is smaller than a total area of the one or plurality of first ground pads in contact with the via in the column lined up along the side of the outline of the capacitor region so as to be adjacent to the capacitor region is satisfied.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

When a first board at which an electronic component is mounted is mounted at a second board by a plurality of bumps, currents may flow concentratedly to some bumps of the plurality of bumps. In this case, a current exceeding an allowable current may flow to the bump at which the current concentrates, and damage such as disconnection may occur.

In one aspect, concentration of currents on some bumps may be relaxed.

Hereinafter, embodiments of the present invention will be described with reference to the drawings.

Embodiment 1

Figure 1A:
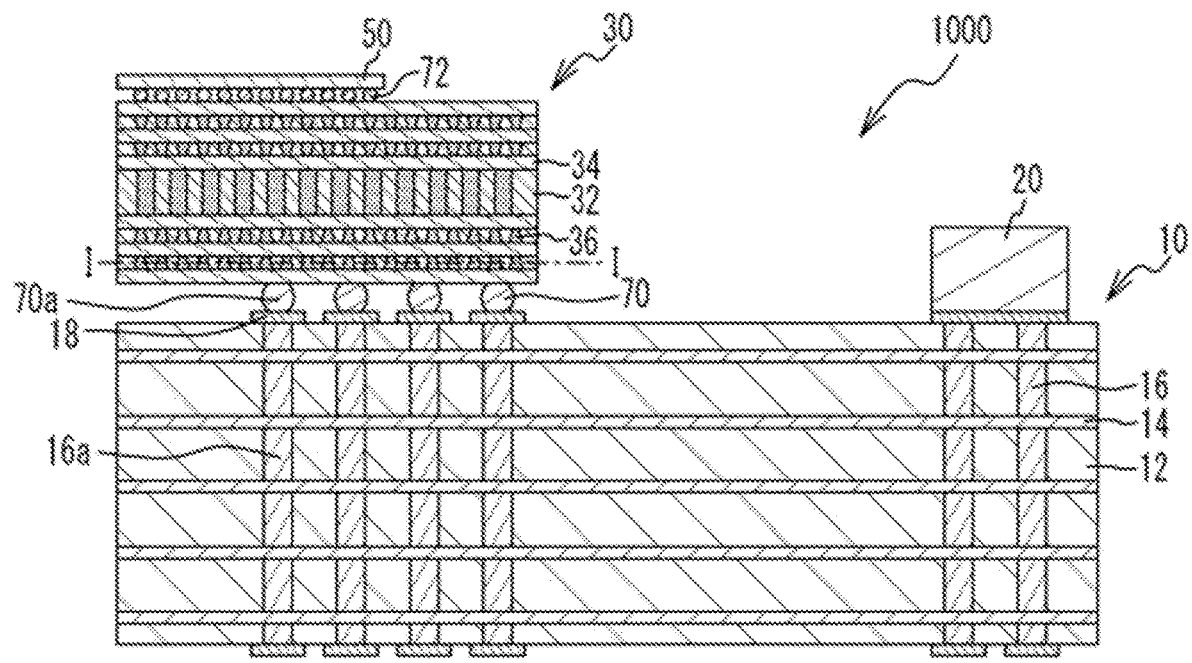
FIG. 1A is a cross-sectional view of an electronic apparatus according to Comparative Example 1.
Figure 1B:
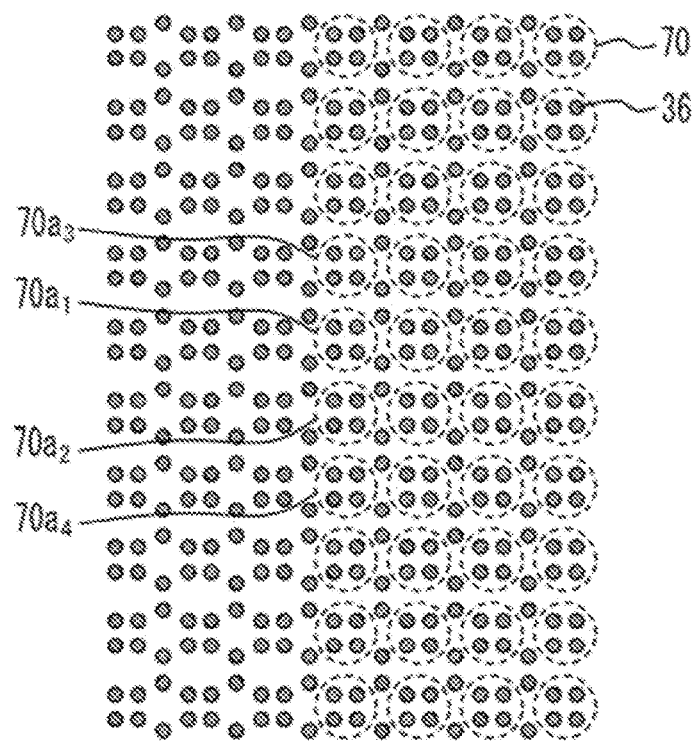
FIG. 1B is a cross-sectional view taken along a line I-I of FIG. 1A.

First, an electronic apparatus according to Comparative Example 1 will be described. FIG. 1A is a cross-sectional view of an electronic apparatus according to Comparative Example 1, and FIG. 1B is a cross-sectional view taken along a line I-I of FIG. 1A. As illustrated in FIG. 1A, an electronic apparatus 1000 according to Comparative Example 1 includes a printed board 10, a package board 30, and an electronic component 50. The package board 30 is mounted at the printed board 10 by a plurality of bumps 70. The electronic component 50 is mounted at the package board 30 by a plurality of bumps 72. A power source 20 is provided on the printed board 10. The electronic component 50 is electrically coupled to the power source 20 through wiring layers 14, vias 16, and pads 18 provided at an insulating film 12 of the printed board 10 and wiring layers 34 and vias 36 provided at an insulating film 32 of the package board 30. As illustrated in FIG. 1B, the via 36 is provided immediately above each of the plurality of bumps 70 arranged in a lattice shape.

In Comparative Example 1, currents supplied from the power source 20 are easy to concentratedly flow to inner bumps 70a in FIG. 1A, and are easy to concentratedly flow to bumps $70a_1$ and $70a_2$ located in a central portion in an inner column in FIG. 1B. This is considered to be due to the following reasons. For example, vias 16a coupled to the bumps 70a are vias coupled to the wiring layers 14 on a downstream side in a direction in which the currents supplied from the power source 20 flow through the wiring layers 14. Thus, it is considered that the currents are hard to flow to a downstream side of portions of the wiring layers 14 at which the vias 16a are coupled, and as a result, the currents concentratedly flow to the vias 16a, In the bumps $70a_1$ and $70a_2$ located in the central portion in the inner column, a wiring distance between the power source 20 and the electronic component 50 is easy to be shorter and a resistance is easy to be lower than those in the other bumps 70. Thus, it is considered that the currents are easy to concentrate on the bumps $70a_1$ and $70a_2$ located in the central portion in the inner column. When the amount of currents supplied from the power source 20 increases, it is considered that a large amount of currents also flows to bumps $70a_3$ and $70a_4$ located adjacent to the bumps $70a_1$ and $70a_2$.

When the current concentratedly flows to the bumps 70a, currents exceeding an allowable current flow to the bumps 70a, and damage such as disconnection may occur. For example, a current density of the bumps 70a increases, disconnection due to electromigration may occur. Thus, embodiments in which the concentration of the currents on some bumps of the plurality of bumps 70 may be suppressed will be described below.

Figure 2:
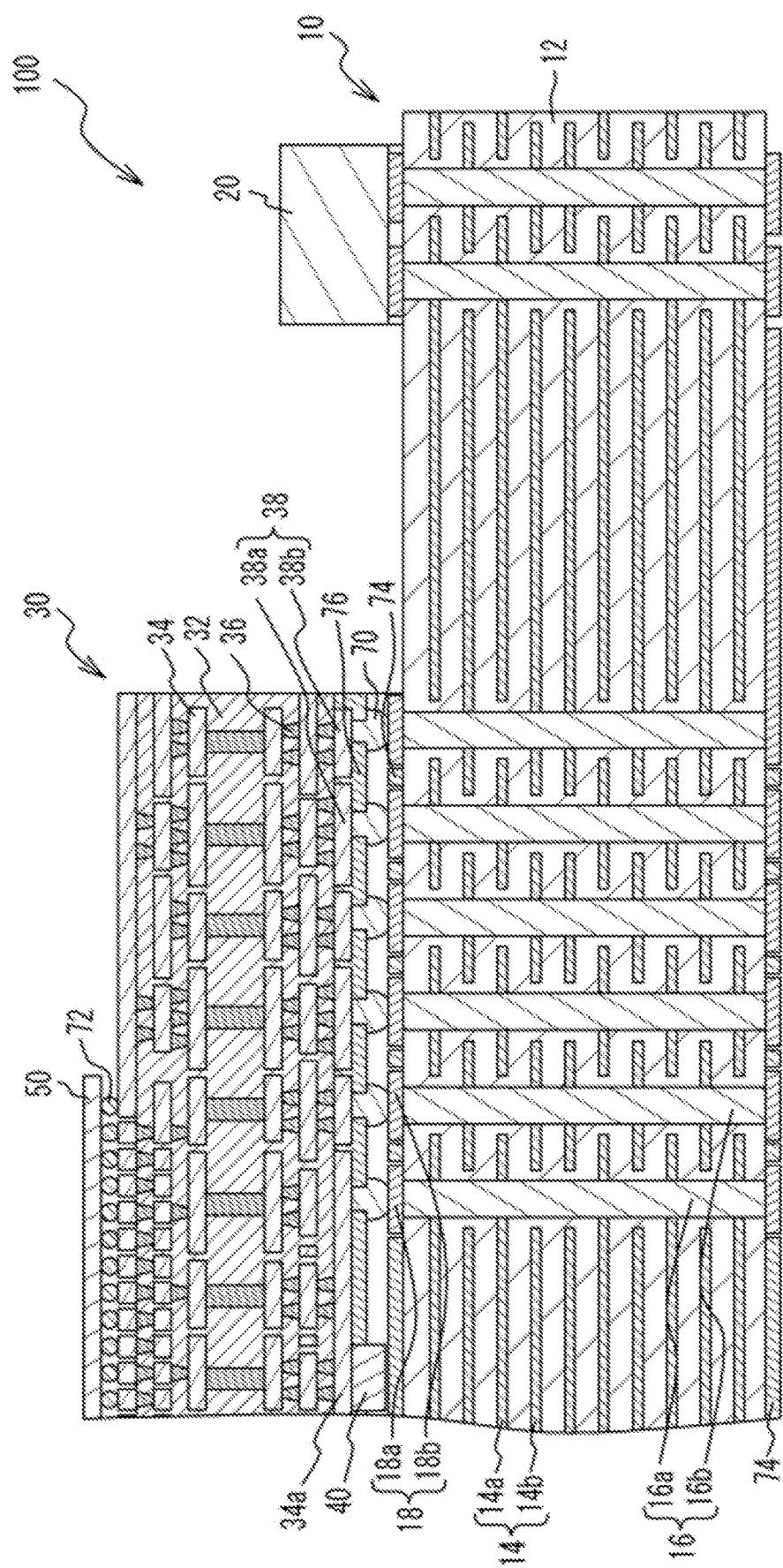
FIG. 2 is a cross-sectional view of electronic apparatus according to Embodiment 1.

FIG. 2 is a cross-sectional view of an electronic apparatus according to Embodiment 1. FIG. 2 illustrates a part of the electronic apparatus of Embodiment 1 for clarification of the drawing. As illustrated in FIG. 2, an electronic apparatus 100 according to Embodiment 1 includes a printed board 10, a package board 30, and an electronic component 50.

The printed board 10 includes an insulating film 12, wiring layers 14 extending in a direction intersecting a thickness direction of the insulating film 12, vias 16 extending in the thickness direction of the insulating film 12, and pads 18 provided at upper and lower surfaces of the insulating film 12. A power source 20 is mounted at the upper surface of the insulating film 12. The power source 20 is a power source unit that supplies a power such as a DC-DC converter. The pads 18 include ground pads 18a coupled to the ground and power source pads 18b coupled to a power source side of the power source 20, The wiring layers 14 include ground wiring layers 14a coupled to the ground pads 18a and power source wiring layers 14b coupled to the power source pads 18b. The vias 16 include ground vias 16a coupled to the ground pads 18a and the ground wiring layers 14a and power source vias 16b coupled to the power source pads 18b and the power source wiring layers 14b. The insulating film 12 is made of an organic material containing a resin material such as, for example, an epoxy resin as a main component or a ceramic material such as aluminum oxide. The wiring layers 14, the vias 16, and the pads 18 are made of metal such as, for example, copper or gold.

Resist films 74 having openings in regions in which the pads 18 are provided are provided on upper and lower surfaces of the printed board 10. The resist film 74 is, for example, a solder resist film.

The package board 30 is mounted at the printed board 10 by a plurality of bumps 70 such as solder balls. The package board 30 includes an insulating film 32, wiring layers 34 extending in a direction intersecting a thickness direction of the insulating film 32, vias 36 extending in the thickness direction of the insulating film 32, and pads 38 provided at upper and lower surfaces of the insulating film 32. The pads 38 include ground pads 38a coupled to the ground and power source pads 38b coupled to the power source side of the power source 20. The package board 30 is mounted at the printed board 10 by bonding the ground pads 38a to the ground pads 18a by the bumps 70 and bonding the power source pads 38b to the power source pads 18b by the bumps 70.

The wiring layers 34 include ground wiring layers coupled to the ground pads 38a and power source wiring layers coupled to the power source pads 38b. The vias 36 include ground vias coupled to the ground pads 38a and the ground wiring layers and power source vias coupled to the power source pads 38b and the power source wiring layers. The insulating film 32 is made of an organic material containing a resin material such as, for example, an epoxy resin as a main component or a ceramic material such as aluminum oxide. The wiring layers 34, the vias 36, and the pads 38 are made of metal such as, for example, copper or gold.

A capacitor 40 is mounted at the package board 30. The capacitor 40 is, for example, a chip component and is mounted at a ground wiring layer 34a provided at the lower surface of the insulating film 32. Only one capacitor 40 may be provided, or two or more capacitors may be provided.

A resist film 76 having openings that expose the pads 38 are provided at a lower surface of the package board 30. The resist film 76 also has an opening that exposes the ground wiring layer 34a in a region in which the capacitor 40 is mounted. The resist film 76 is, for example, a solder resist film. The bumps 70 are bonded to the pads 38 exposed through the openings of the resist film 76.

The electronic component 50 is mounted at an upper surface of the package board 30 by a plurality of bumps 72. The electronic component 50 is a semiconductor component such as, for example, large scale integration (LSI), but may be another component. The electronic component 50 is electrically coupled to the pads 38 through the wiring layers 34 and the vias 36. For example, the electronic component 50 is electrically coupled to the power source 20 mounted at the printed board 10 and operates by a power supplied from the power source 20. The capacitor 40 is provided to stably supply a power of a fixed voltage to the electronic component 50.

Figure 3:
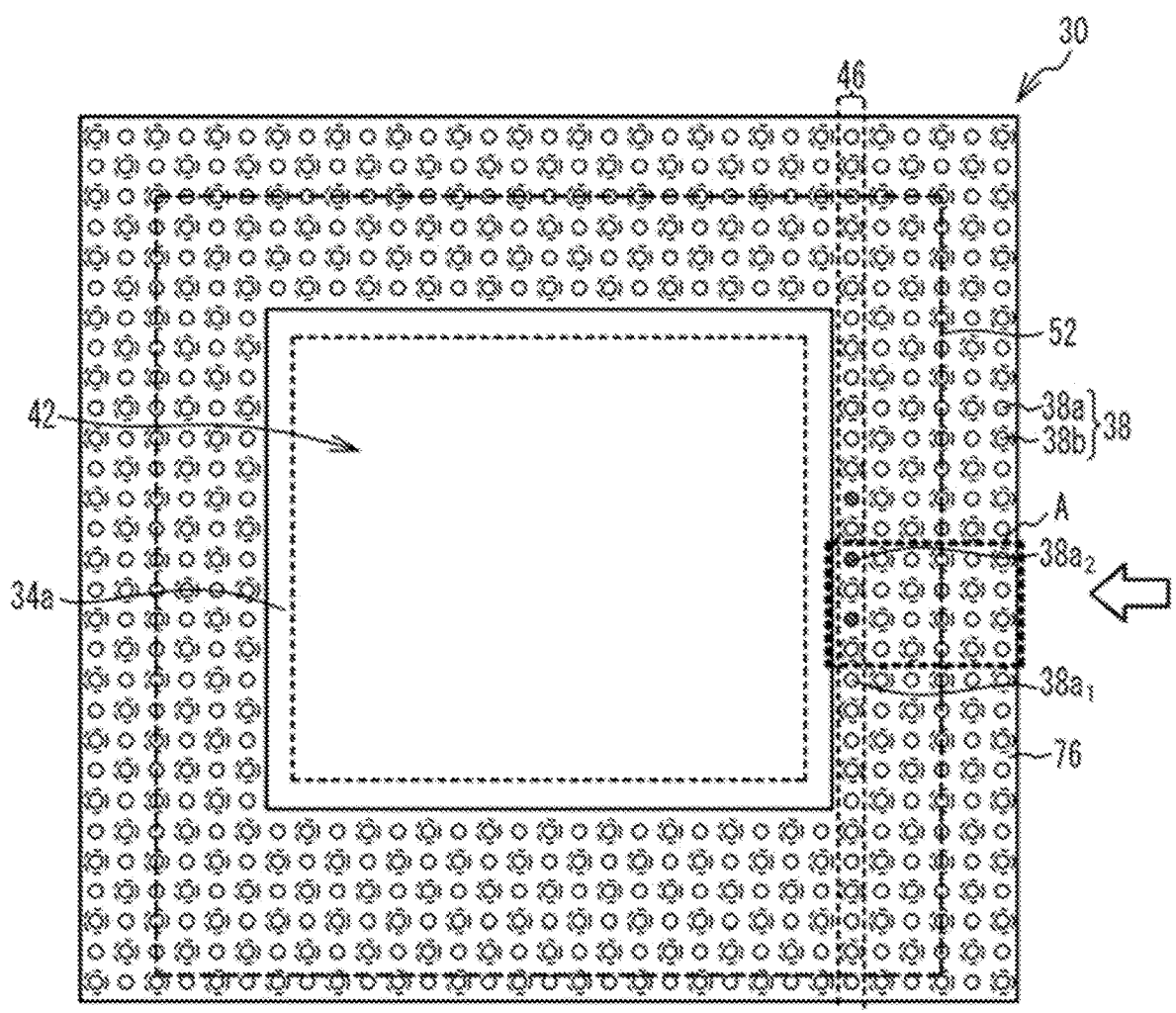
FIG. 3 is a plan view of a package board according to Embodiment 1.
Figure 4A:
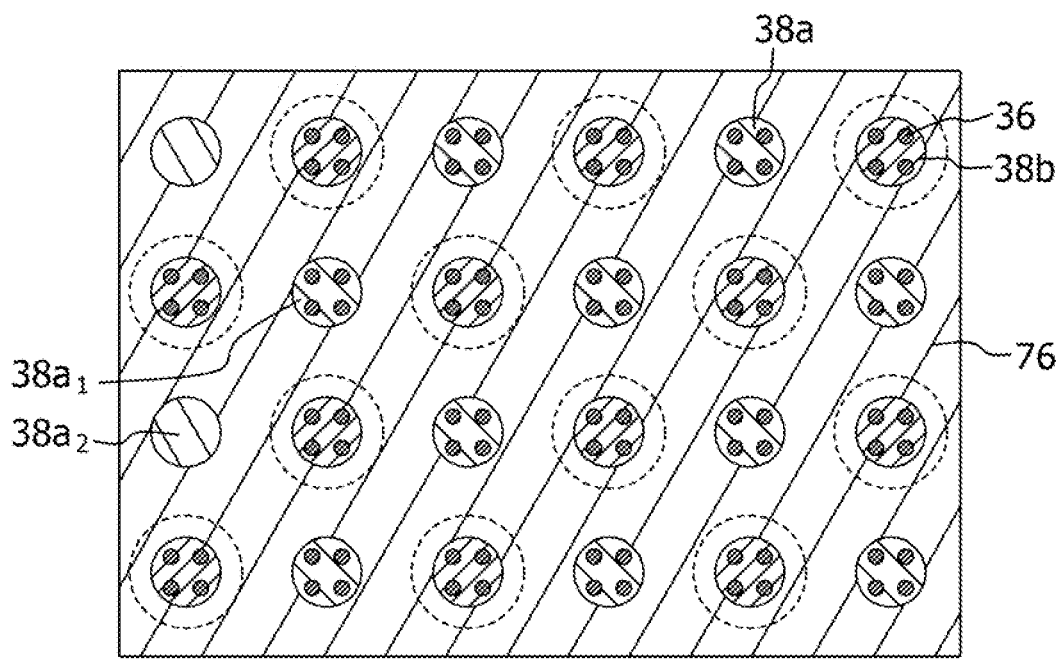
FIG. 4A is an enlarged view of a region A of FIG. 3.
Figure 4B:
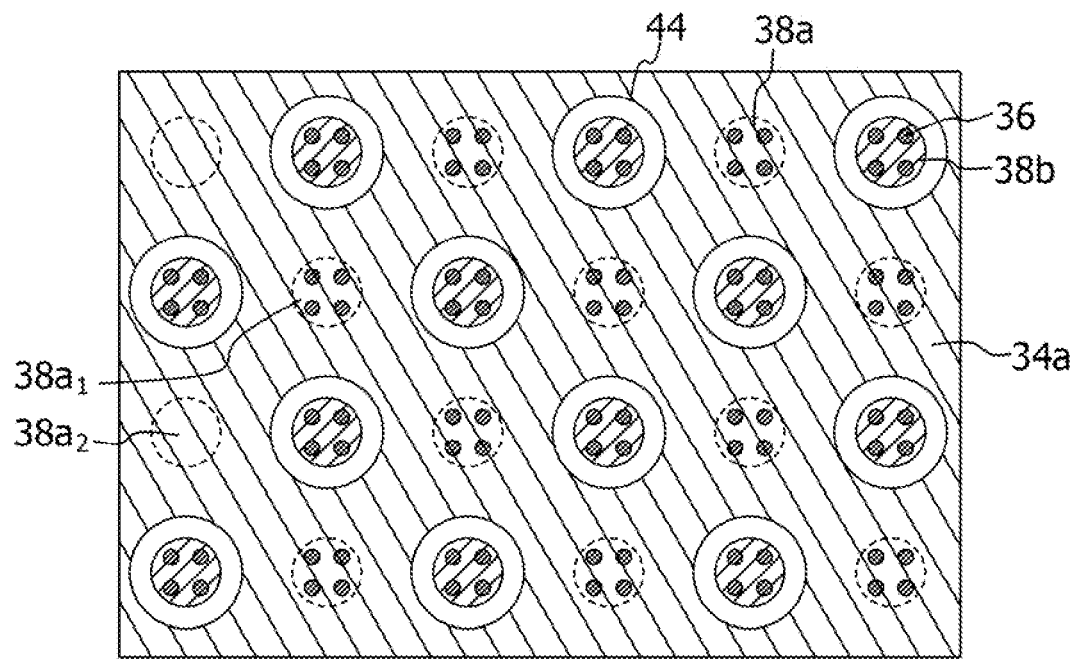
FIG. 4B is a perspective view of a resist film of FIG. 4A.

FIG. 3 is a plan view of the package board according to Embodiment 1. FIG. 4A is an enlarged view of a region A of FIG. 3, and FIG. 4B is a perspective view of the resist film of FIG. 4A. FIG. 3 is a plan view of a lower surface side of the package board 30 to which the bumps 70 are coupled. In FIG. 3, an outline of a region 52 in which the electronic component 50 is projected onto the package board 30 is illustrated by a broken line, and a flow of the currents supplied from the power source 20 is illustrated by a white arrow. As illustrated in FIG. 3, a plurality of ground pads 38a and a plurality of power source pads 38b are provided so as to surround a capacitor region 42 in which the capacitor 40 is mounted. The plurality of ground pads 38a and the plurality of power source pads 38*b* are alternately lined up lengthwise and breadthwise and arranged in a lattice shape. The plurality of ground pads 38*a* has sizes identical to each other. The plurality of power source pads 38*b* has sizes identical to each other. The ground pads 38*a* and the power source pads 38*b* may have sizes identical to each other or sizes different from each other. The identical sizes are not limited to a case where the sizes are completely identical, and includes a case where the sizes are different to an extent of a manufacturing error.

As illustrated in FIGS. 4(*a*) and 4(*b*), the ground pads 38*a* are portions of the ground wiring layer 34*a* which is a solid film provided on the lower surface of the package board 30 which are exposed through the openings of the resist film 76. The power source pads 38*b* are located in the openings provided in the ground wiring layer 34*a*, and gaps 44 are provided between the power source pads and the ground wiring layer 34*a*. Accordingly, the ground pads 38*a* and the power source pads 38*b* are not electrically coupled. Since the bumps 70 are bonded to the ground pads 38*a* and the power source pads 38*b* exposed through the openings of the resist film 76, it may be said that the ground pads 38*a* and the power source pads 38*b* are metal films in regions to which the bumps 70 are bonded and are metal films in regions exposed through the openings of the resist film 76.

The ground pads 38*a* include ground pads $38a_1$ with which the vias 36 are in contact and ground pads $38a_2$ with which the vias 36 are not in contact. In FIG. 3, the ground pads $38a_1$ are illustrated in white, and the ground pads $38a_2$ are illustrated in black. As illustrated in FIG. 3, one or a plurality of ground pads $38a_1$ with which the via 36 is in contact and one or a plurality of ground pads $38a_2$ with which the via 36 is not in contact are included in a column 46 adjacent to the capacitor region 42 among a plurality of columns formed by the plurality of pads 38. The ground pads $38a_2$ are arranged in a central portion of a side of an outline of the capacitor region 42. The ground pads $38a_2$ are not arranged at ends of the side of the outline of the capacitor region 42.

Simulations performed for the electronic apparatus 100 of Embodiment 1 and an electronic apparatus of Comparative Example 2 will be described. The electronic apparatus of Comparative Example 2 is different from the electronic apparatus 100 of Embodiment 1 in that all the ground pads 38*a* are constituted by the ground pads $38a_1$ in contact with the via 36. Otherwise, the electronic apparatus of Comparative Example 2 has a configuration identical to the configuration of the electronic apparatus 100 of Embodiment 1. The simulation was performed under the following conditions. The printed board 10 was made of an FR4 substrate, and 12 wiring layers 14 were laminated. The wiring layers 14, the vias 16, and the pads 18 were made of copper. The package board 30 was made of an organic material containing an epoxy resin as a main component, and 12 wiring layers 34 were laminated. The wiring layers 34, the vias 36, and the pads 38 are made of copper. The bumps 70 were solder balls and had a pitch interval of 1 mm. For this structure, current values flowing through the bumps 70 bonded to the ground pads 18*a* and 38*a* were calculated when a current consumed by the electronic component 50 was 200 A.

Figure 5:
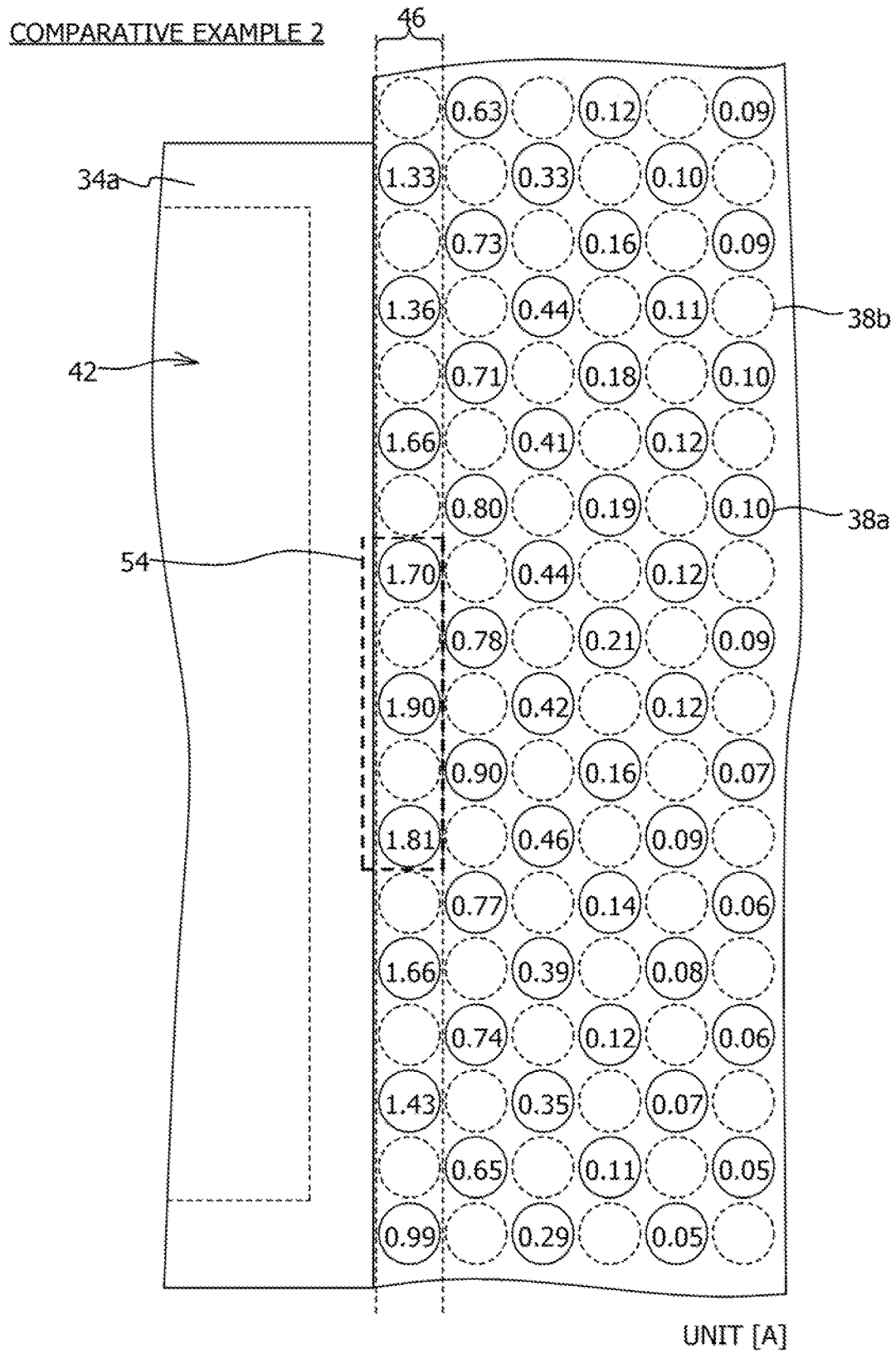
FIG. 5 illustrates a simulation result of an electronic apparatus according to Comparative Example 2.
Figure 6:
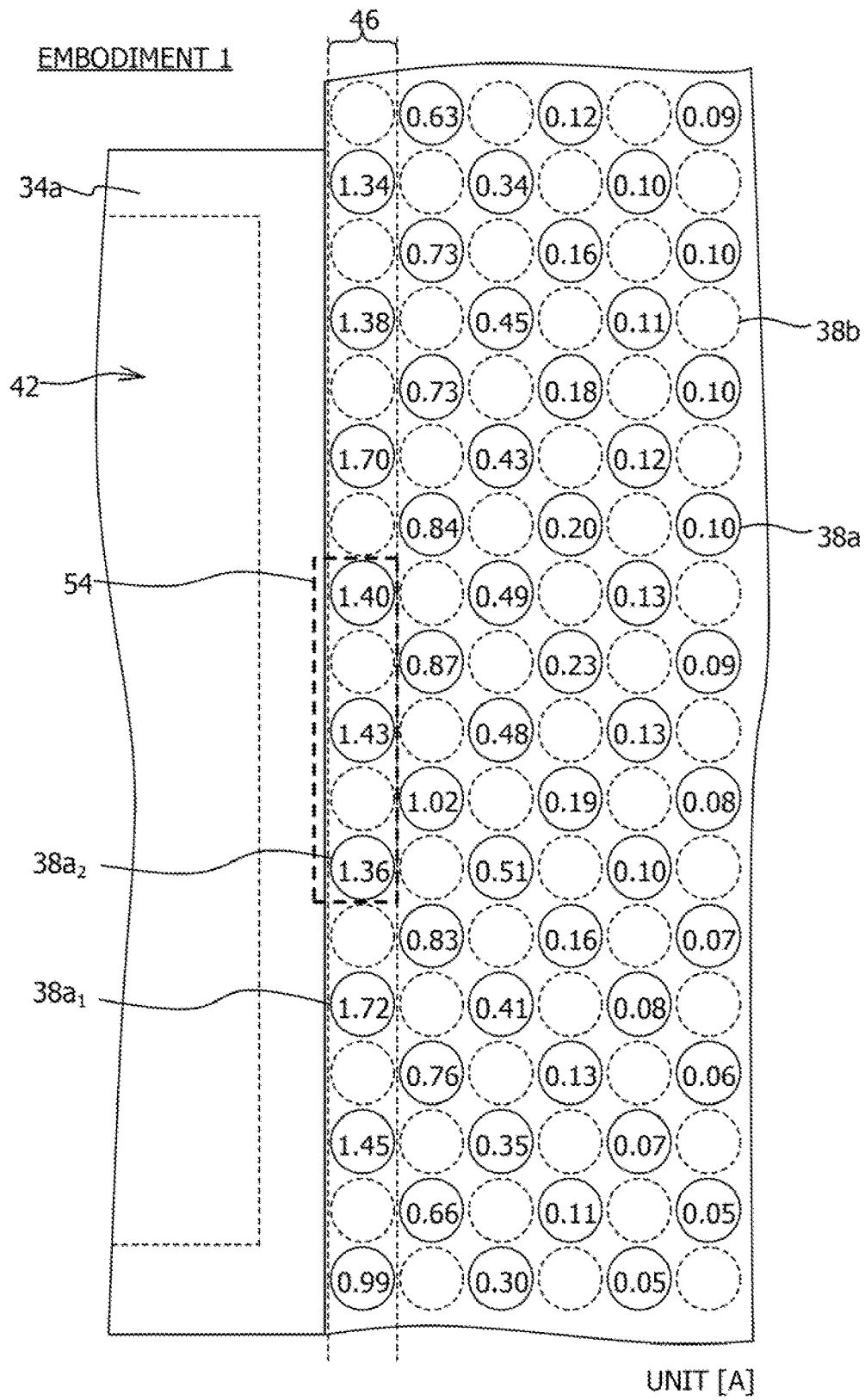
FIG. 6 illustrates a simulation result of the electronic apparatus according to Embodiment 1.

FIG. 5 illustrates a simulation result of the electronic apparatus according to Comparative Example 2. FIG. 6 illustrates a simulation result of the electronic apparatus according to Embodiment 1. In FIGS. 5 and 6, current values (unit: A) flowing through the bumps 70 are illustrated in the ground pads 38*a*. As illustrated in FIG. 5, in the electronic apparatus of Comparative Example 2, a result in which the currents concentratedly flow to the bumps 70 bonded to the ground pads 38*a* in a region 54 adjacent to the capacitor region 42 and located in the central portion of the side of the outline of the capacitor region 42 was obtained. A maximum current value was 1.90 A. As illustrated in FIG. 6, in the electronic apparatus 100 of Embodiment 1, the currents flowing through the bumps 70 bonded to the ground pads 38*a* in the region 54 were smaller than the currents in the electronic apparatus of Comparative Example 2. Instead, the currents flowing through the bumps 70 bonded to the ground pads 38*a* adjacent to the ground pads 38*a* in the region 54 in the identical column 46 are larger than the currents of the electronic apparatus of Comparative Example 2. A maximum current value was 1.72 A.

As described above, in the electronic apparatus 100 of Embodiment 1, the current values flowing through the bumps 70 bonded to the ground pads 38*a* in the region 54 were smaller than the current values in the electronic apparatus of Comparative Example 2. This is considered to be due to the following reasons. For example, in Embodiment 1, the ground pads 38*a* in the region 54 are the ground pads $38a_2$ not in contact with the via 36. Thus, it is considered that the currents are hard to flow through the bumps 70 bonded to the ground pads $38a_2$ and the currents are distributed and flow to the bumps 70 bonded to the ground pads $38a_1$ around the ground pads $38a_2$. Thus, it is considered that the current values flowing through the bumps 70 bonded to the ground pads $38a_2$ decrease.

According to Embodiment 1, as illustrated in FIGS. 3 to 4(*b*), the plurality of ground pads 38*a* includes the ground pad $38a_1$ in contact with the via 36 and the ground pads $38a_2$ not in contact with the via 36 in the column 46 which is adjacent to the capacitor region 42 and is along the side of the capacitor region 42. Thus, as illustrated in FIGS. 5 and 6, the concentration of the currents on some bumps 70 among the plurality of bumps 70 may be relaxed. Thus, the reliability of the bumps 70 may be improved. Although a case where the via 36 is not in contact with the ground pads $38a_2$ has been described as an example in Embodiment 1, the via 36 may be in contact with the ground pads $38a_2$ in an area smaller than an area of the ground pads $38a_1$. For example, the plurality of ground pads 38*a* may include the ground pads $38a_1$ with which the via 36 is in contact and the ground pad $38a_2$ of which a total area in contact with the via 36 is smaller than a total area of the ground pads $38a_1$ in contact with the via 36 in the column 46. In this case, since the currents are also hard to flow through the bumps 70 bonded to the ground pads $38a_2$, the current concentration may be relaxed.

As illustrated in FIG. 5 of Comparative Example 2, large currents are easy to flow through the bumps 70 located in the central portion of the side of the outline of the capacitor region 42. Accordingly, as illustrated in FIG. 3, the ground pads $38a_2$ may be arranged in the central portion of the side of the outline of the capacitor region 42 and may not be arranged at the ends. Thus, the concentration of the currents on some bumps 70 may be relaxed, and the stability of the supply of the power of the fixed voltage to the electronic component 50 may be improved by reducing the number of the ground pads $38a_2$ with which the via 36 is not in contact.

As illustrated in FIG. 3, it is preferable that the ground pads $38a_2$ are provided so as to be located at a side located on an upstream side of the currents supplied from the power source 20 among the sides of the outline of the capacitor region 42. Accordingly, the concentration of the currents on the bumps 70 in the portions in which the wiring distance between the power source 20 and the electronic component 50 is easy to be short (for example, a wiring resistance is easy to be small) may be effectively relaxed.

Embodiment 2

Figure 7:
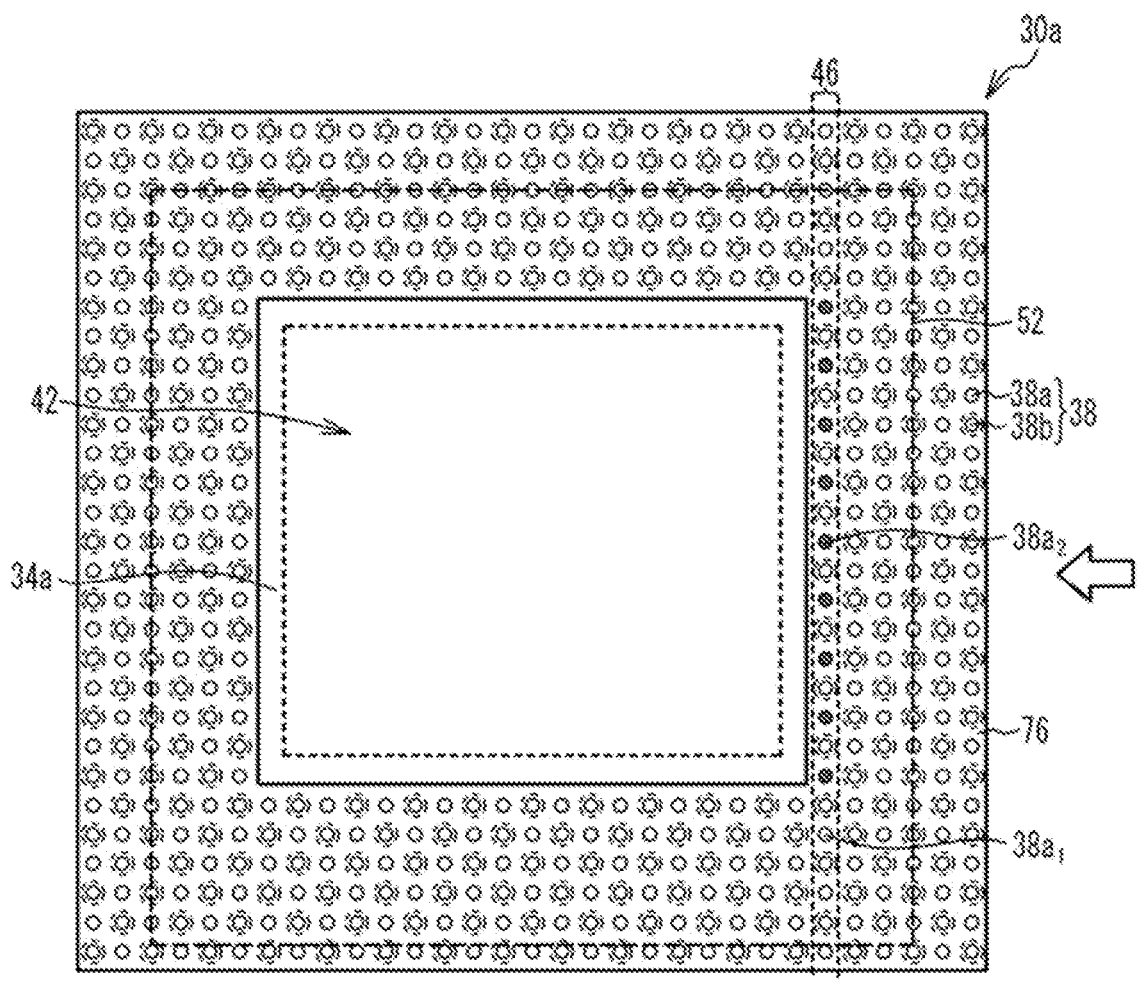
FIG. 7 is a plan view of a package board according to Embodiment 2.

FIG. 7 is a plan view of a package board according to Embodiment 2. Similar to FIG. 3, FIG. 7 illustrates a plan view of a lower surface side of a package board 30a to which bumps 70 are coupled. As illustrated in FIG. 7, in Embodiment 2, ground pads $38a_2$ are arranged from one end to the other end of a side of an outline of a capacitor region 42. Other configurations of the electronic apparatus according to Embodiment 2 are identical to the configurations in Embodiment 1, and thus, the illustration and description thereof are omitted.

Figure 8:
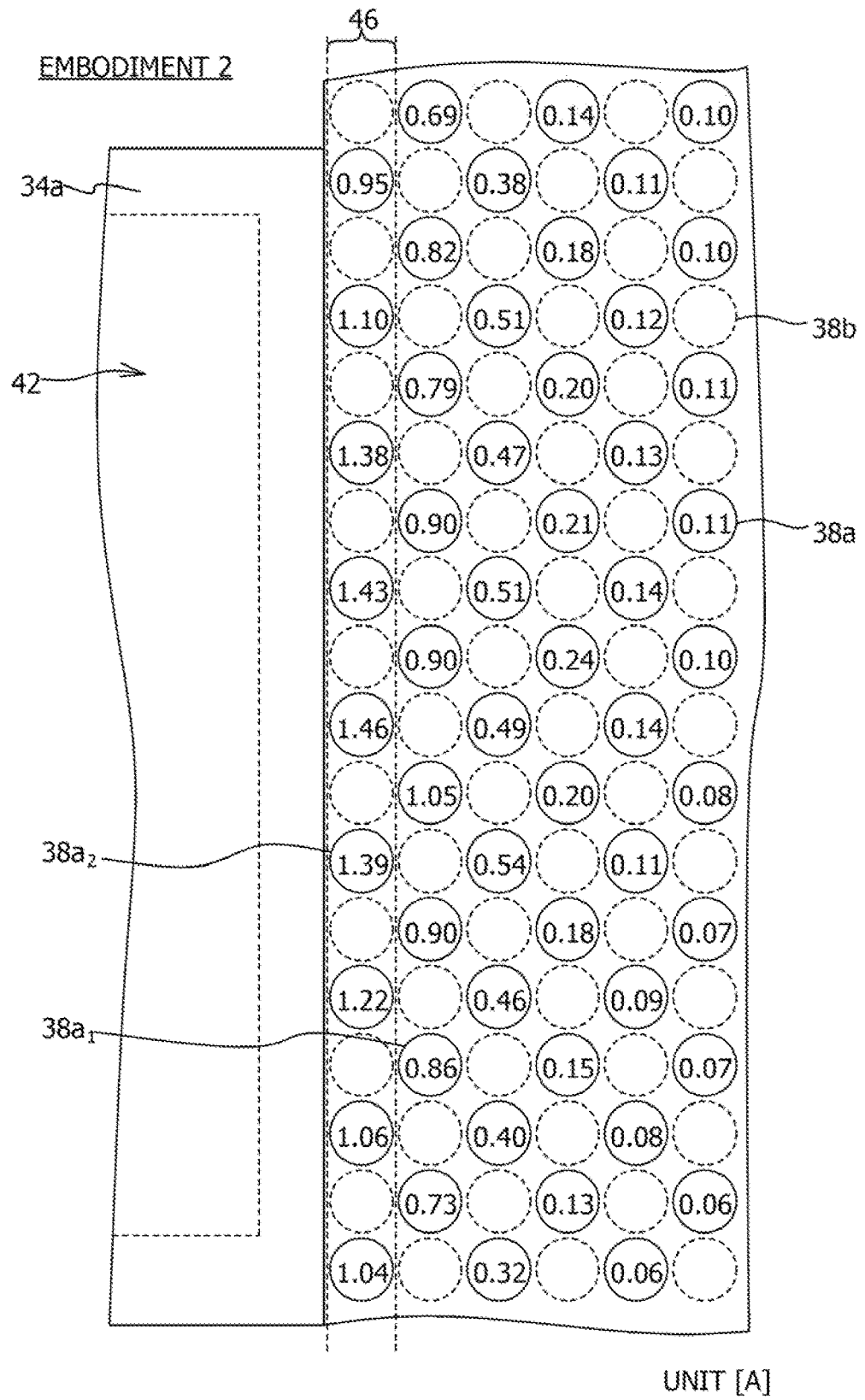
FIG. 8 illustrates a simulation result of an electronic apparatus according to Embodiment 2.

FIG. 8 illustrates a simulation result of the electronic apparatus according to Embodiment 2. In FIG. 8, current values (unit: A) flowing through the bumps 70 are illustrated in ground pads 38a. A simulation was performed under conditions identical to the conditions described in Embodiment 1. As illustrated in FIG. 8, in the electronic apparatus of Embodiment 2, the currents flowing through the bumps 70 bonded to the ground pads 38a in a column 46 decreases, and a maximum current value is 1.46 A. The bump 70 having the maximum current value was a bump coupled to the ground pad 38a located in the vicinity of the center of the side of the outline of the capacitor region 42. It is considered that since the ground pads $38a_2$ are provided from one end to the other end of the side of the outline of the capacitor region 42, the currents flowing through the bumps 70 bonded to the ground pads 38a in the column 46 decrease.

According to Embodiment 2, as illustrated in FIG. 7, the ground pads $38a_2$ are arranged from one end to the other end of the side of the outline of the capacitor region 42. Thus, as illustrated in FIG. 8, the currents flowing through the plurality of bumps 70 may be further distributed, and the concentration of the currents on some bumps 70 may be further relaxed.

Embodiment 3

Figure 9:
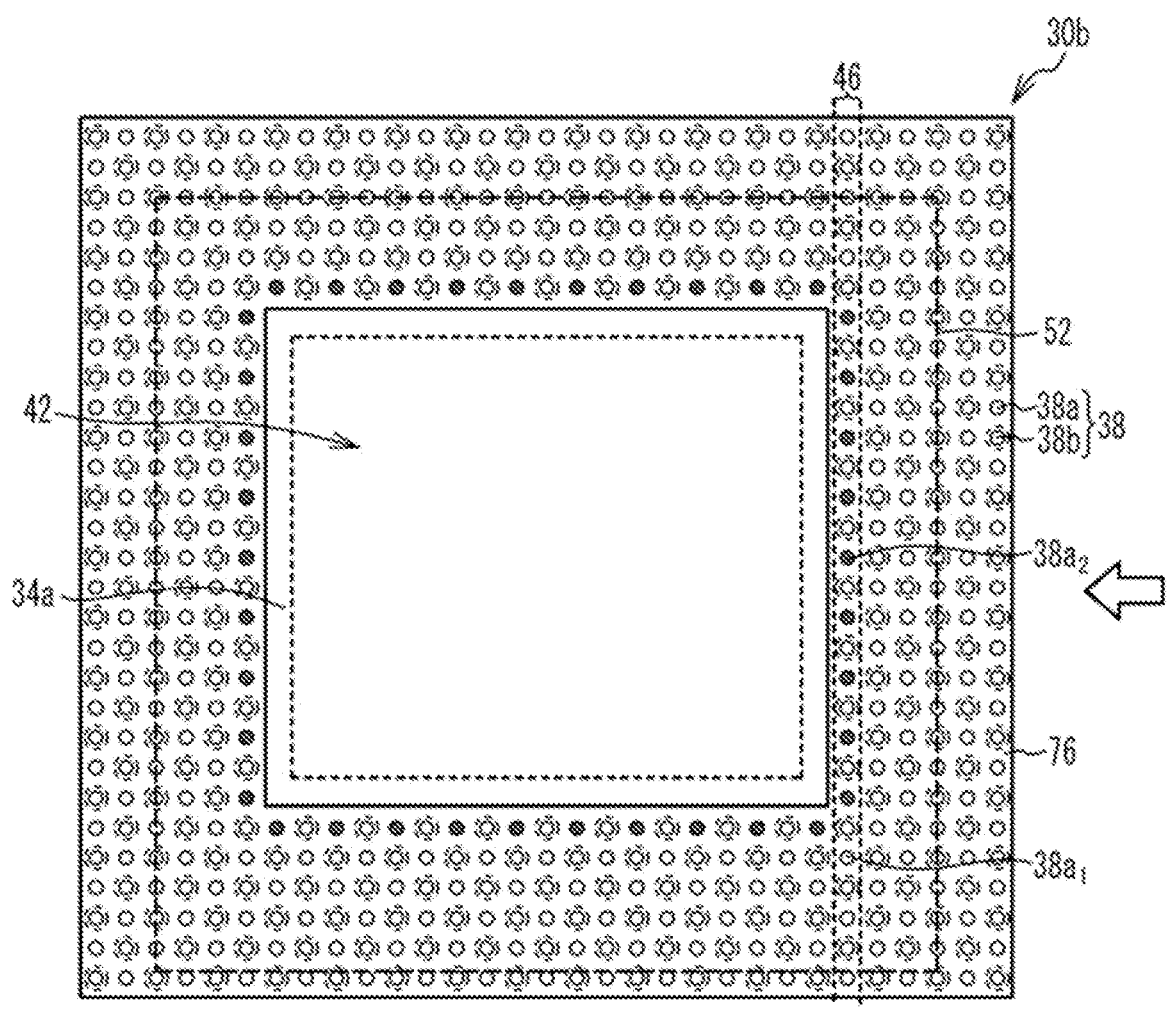
FIG. 9 is a plan view of a package board according to Embodiment 3.

FIG. 9 is a plan view of a package board according to Embodiment 3. Similar to FIG. 3, FIG. 9 illustrates a plan view of a lower surface side of a package board 30b to which bumps 70 are coupled. As illustrated in FIG. 9, in Embodiment 3, ground pads $38a_2$ are arranged so as to surround a capacitor region 42. Other configurations of the electronic apparatus according to Embodiment 3 are identical to the configurations in Embodiment 1, and thus, the illustration and description thereof are omitted.

According to Embodiment 3, the ground pads $38a_2$ are arranged so as to surround the capacitor region 42. Accordingly, the concentration of the currents on some bumps 70 may be further relaxed.

Embodiment 4

Figure 10:
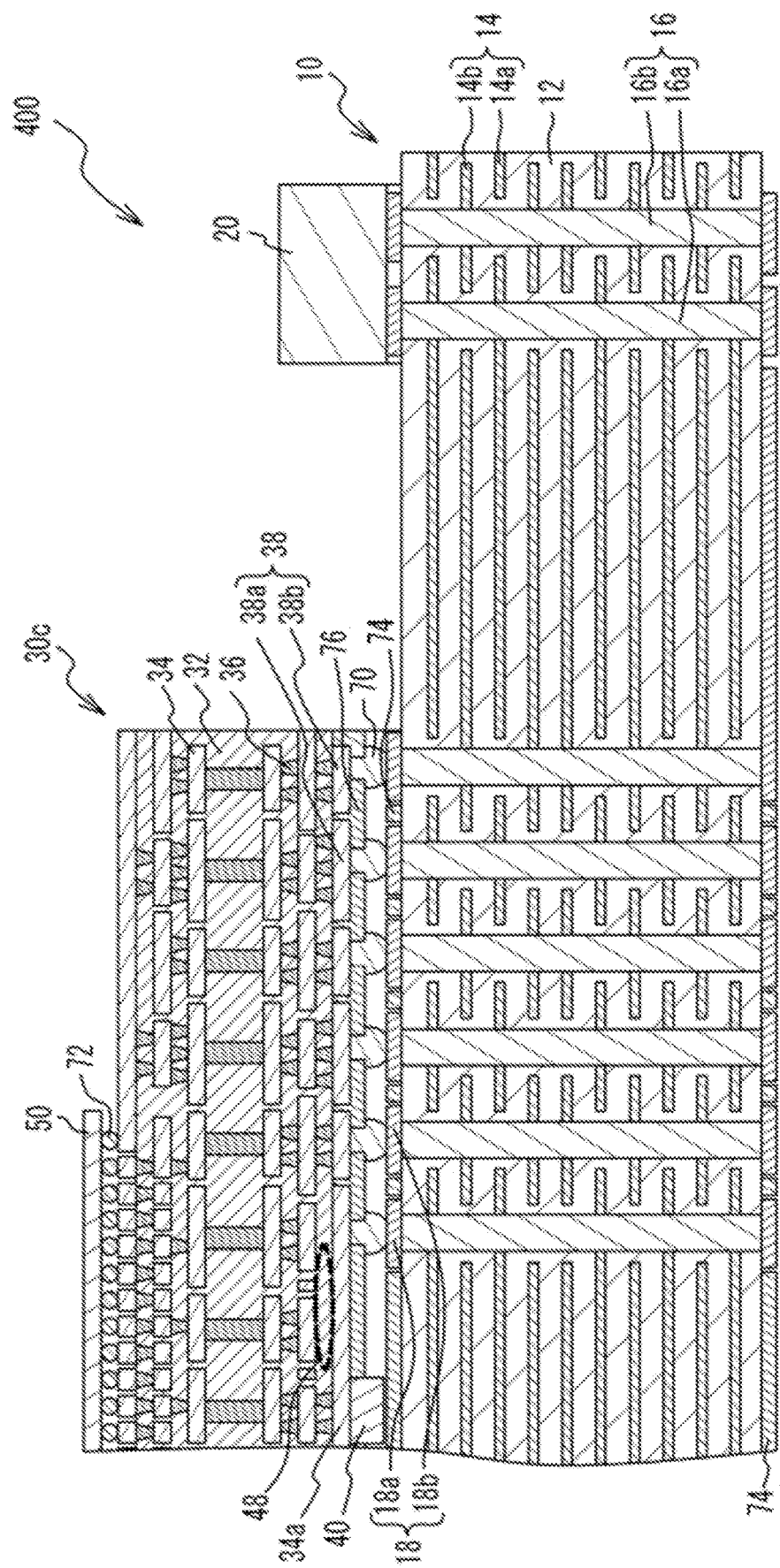
FIG. 10 is a cross-sectional view of an electronic apparatus according to Embodiment 4.
Figure 11:
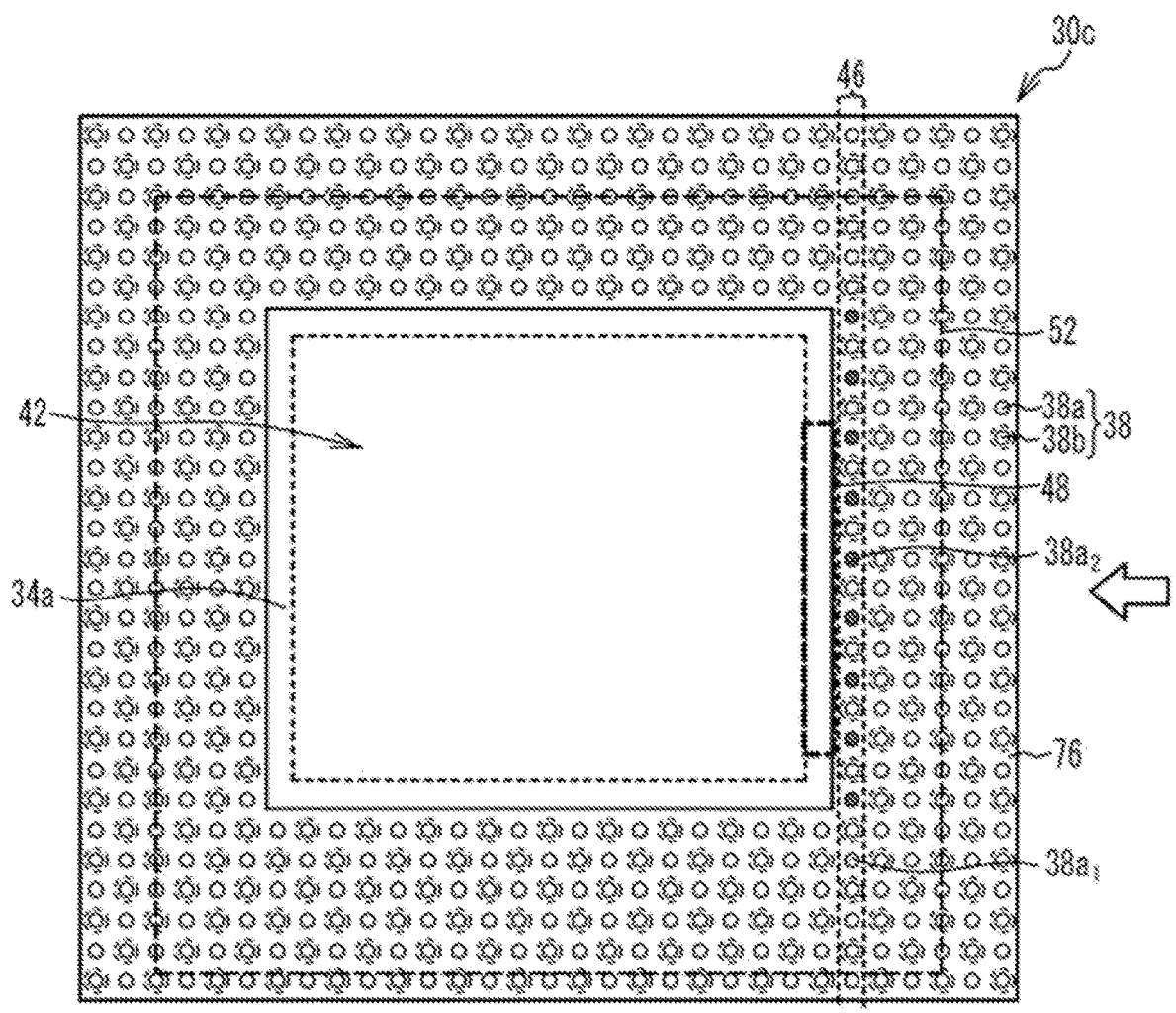
FIG. 11 is a plan view of a package board according to Embodiment 4.

FIG. 10 is a cross-sectional view of an electronic apparatus according to Embodiment 4. FIG. 11 is a plan view of a package board according to Embodiment 4. FIG. 11 is a plan view of a lower surface side of a package board 30c to which bumps 70 are coupled. As illustrated in FIGS. 10 and 11, in an electronic apparatus 400 according to Embodiment 4, ground pads $38a_2$ are arranged from one end to the other end of a side of an outline of a capacitor region 42. A ground wiring layer 34a provided in the capacitor region 42 is not in contact with via 36 in at least a partial region 48 of regions located beside a column 46 adjacent to the capacitor region 42. As described above, in Embodiment 4, a region in which the via 36 is not provided is expanded from the column 46 to the capacitor region 42, A length of the region 48 in a direction along the column 46 is longer than a length of one of the ground pad 38a and the power source pad 38b. The length of the region 48 in the direction along the column 46 is longer than a diameter of one bump 70. The region 48 is located so as to include a central portion of the side of the outline of the capacitor region 42. Other configurations are identical to the configurations in Embodiment 1, and thus, the illustration and description thereof are omitted.

Figure 12:
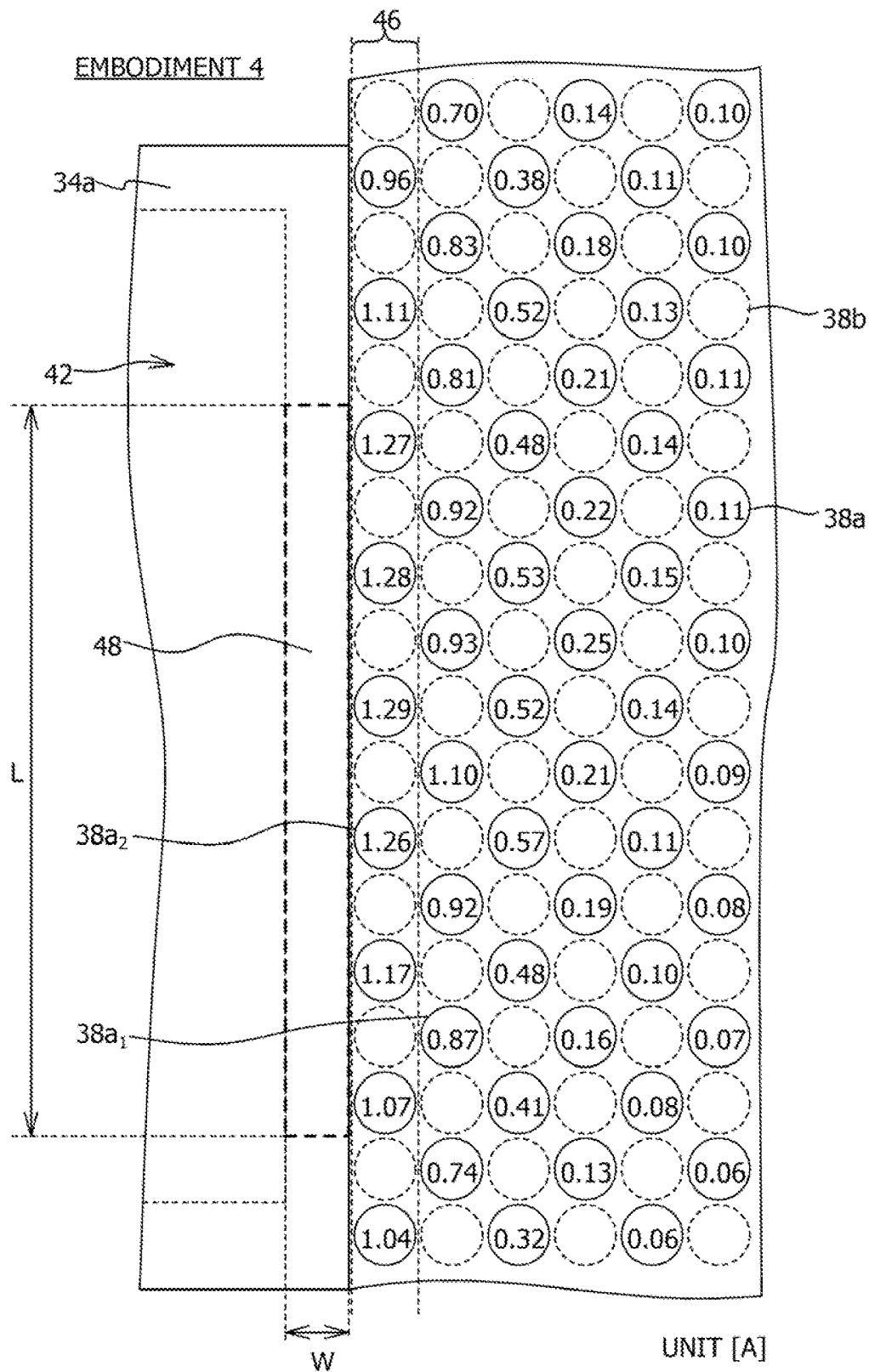
FIG. 12 illustrates a simulation result of the electronic apparatus according to Embodiment 4.

FIG. 12 illustrates a simulation result of the electronic apparatus according to Embodiment 4. In FIG. 12, current values (unit: A) flowing through the bumps 70 are illustrated in the ground pads 38a. In the simulation, a length L of the region 48 in which the via 36 is not provided was set to 11 mm, and a width W was set to 1 mm. The other conditions were identical to the conditions described in Embodiment 1. As illustrated in FIG. 12, in Embodiment 4, the current values flowing through the bumps 70 bonded to the ground pads 38a in the column 46 further decrease, and a maximum current value is 1.29 A. The bump 70 having the maximum current value was the bump 70 coupled to the ground pad 38a located in the vicinity of the center of the side of the outline of the capacitor region 42. It is considered that since the ground wiring layer 34a is not in contact with the via 36 in the region 48, the currents flowing through the bumps 70 bonded to the ground pads 38a in the column 46 decrease.

According to Embodiment 3, as illustrated in FIGS. 10 and 11, the ground wiring layer 34a provided in the capacitor region 42 is not in contact with the via 36 in at least a partial region 48 of regions adjacent to the column 46. Thus, as illustrated in FIG. 12, the concentration of the currents on some bumps 70 may be further relaxed.

As illustrated in FIG. 11, it is preferable that the length L of the region 48 of the ground wiring layer 34a provided in the capacitor region 42 with which the via 36 is not in contact in the direction along the column 46 is longer than a length of one of the ground pad 38a and the power source pad 38b. Thus, the concentration of the currents on some bumps 70 may be effectively relaxed. From the viewpoint of relaxing the concentration of the currents on some bumps 70, the length L of the region 48 in the direction along the column 46 is preferably three times or more, more preferably five times or more, and further preferably seven times or more the length of one of the ground pad 38a and the power source pad 38b. The region 48 may extend from one to the other of a pair of sides of the outline of the capacitor region 42. For example, the length L of the region 48 along the column 46 may be identical to a length of the side of the outline of the capacitor region 42. The region 48 may be provided so as to round once along the side of the outline of the capacitor region 42.

Figure 13:
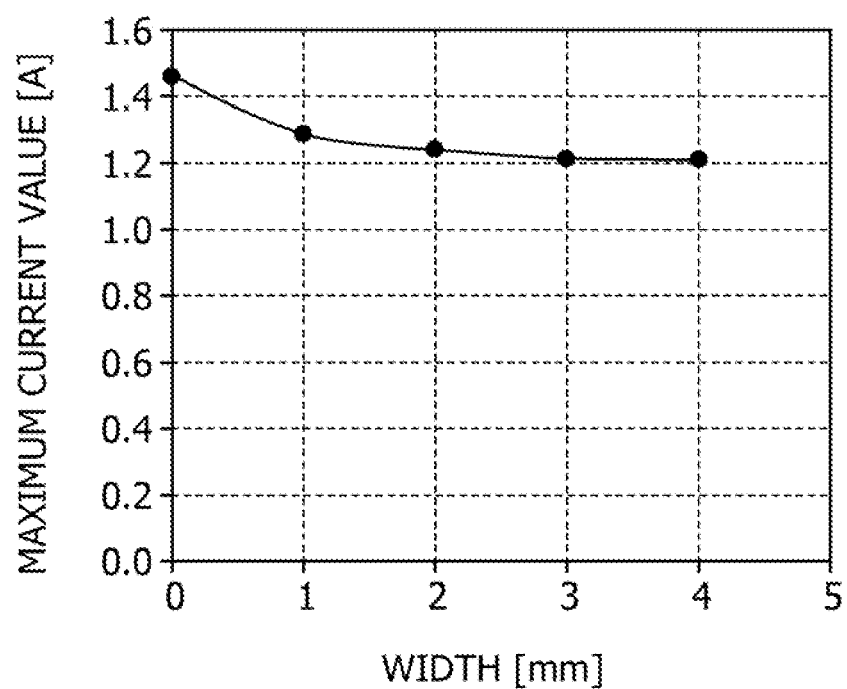
FIG. 13 illustrates a simulation result representing a relationship between a width of a region in which a via is not in contact and a maximum current value flowing through a bump.

Next, a simulation for investigating an influence of the width W of the region 48 on the maximum value of the currents flowing through the bumps 70 will be described. In the simulation, the length L of the region 48 was fixed to 11 mm, and the width W was changed to 1 mm, 2 mm, 3 mm, or 4 mm. The other conditions were identical to the conditions described in Embodiment 1. FIG. 13 illustrates a simulation result representing a relationship between the width W of the region 48 with which the via 36 is not in contact and the maximum value of the currents flowing through the bumps 70. As illustrated in FIG. 13, a result in which the maximum current value decreases as the width W increased until the width W of the region 48 becomes 3 mm was obtained. A result in which when the width W of the region 48 exceeds 3 mm, the maximum current value hardly decreases was obtained.

Based on the simulation result of FIG. 13, it is preferable that the width W of the region 48 of the ground wiring layer 34a provided in the capacitor region 42 with which the via 36 is not in contact in the direction intersecting the direction along the column 46 is wider than 0 mm and equal to or narrower than 3.0 mm. In other words, for example, it is preferable that a region of the ground wiring layer 34a provided in the capacitor region 42 which is large than 0 mm and equal to or smaller than 3.0 mm from an end in the column 46 close to the ground pad 38a is set as the region 48 with which the via 36 is not in contact. Accordingly, an increase in the region in which the via 36 is not provided may be suppressed while relaxing the concentration of the currents on some bumps 70. Thus, the stability of the supply of the power of the fixed voltage to the electronic component 50 may be improved. From the viewpoint of supplying the current of the fixed voltage to the electronic component 50, the width W of the region 48 is more preferably wider than 0 mm and equal to or narrower than 2.5 mm, and further preferably wider than 0 mm and equal to or narrower than 2.0 mm.

As illustrated in FIG. 5 of Comparative Example 2, large currents are easy to flow through the bumps 70 located in the central portion of the side of the outline of the capacitor region 42. Accordingly, as illustrated in FIG. 11, it is preferable that the region 48 of the ground wiring layer 34a provided in the capacitor region 42 with which the via 36 is not in contact is located so as to include the central portion of the side of the outline of the capacitor region 42.

A case where the plurality of ground pads 38a includes the ground pads $38a_1$ with which the via 36 is in contact and the ground pads $38a_2$ of which the total area in contact with the via 36 is smaller than the total area of the ground pad 38a in contact with the via in the column 46 adjacent to the capacitor region 42 has been described as an example in Embodiment 1 to Embodiment 4. However, the present disclosure is not limited to this case, and the same may apply to the power source pads 38b instead of the ground pads 38a or in addition to the ground pads 38a. For example, the plurality of power source pads 38b may include first power source pads with which the via 36 is in contact and second power source pads of which a total area in contact with the via 36 is smaller than a total area of the first power source pads in contact with the via 36 in the column 46 adjacent to the capacitor region 42. In this case, the concentration of the currents on some bumps 70 may also be relaxed.

Although a case where the wiring layer provided in the capacitor region 42 is the ground wiring layer 34a electrically coupled to the ground pads $38a_2$ has been described as an example in Embodiment 4, the present disclosure is not limited to this case. The wiring layer provided in the capacitor region 42 may be the power source wiring layer electrically coupled to the second power source pads, Embodiment 5

Figure 14:
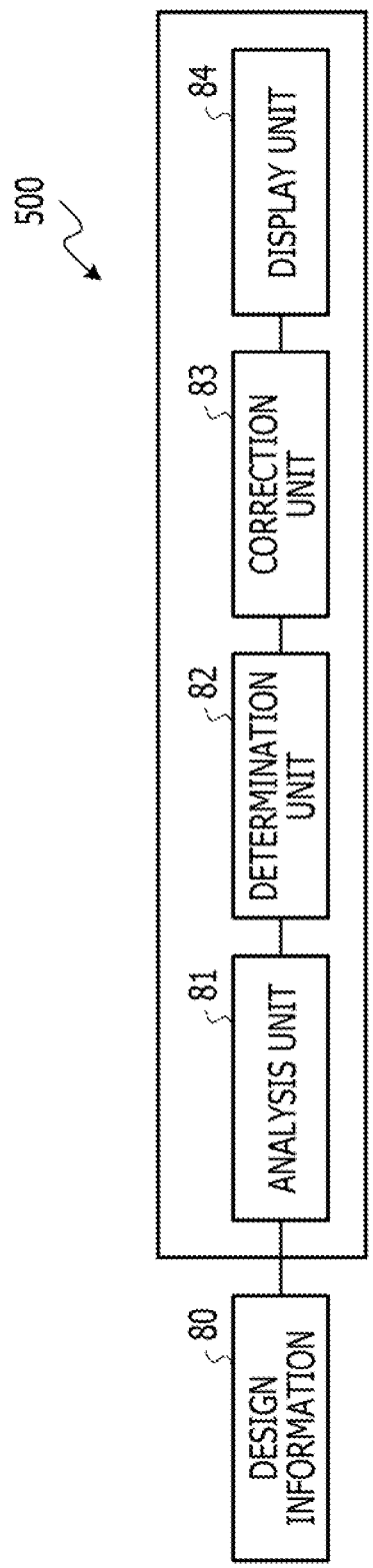
FIG. 14 is a block diagram illustrating a design support apparatus.

In Embodiment 5, a method for supporting a design of the package board 30 will be described. FIG. 14 is a block diagram illustrating a design support apparatus. As illustrated in FIG. 14, design information 80 is input to a board design support apparatus 500 from a graphic processing system such as a CAD system. The board design support apparatus 500 includes an analysis unit 81, a determination unit 82, a correction unit 83, and a display unit 84.

Figure 15:
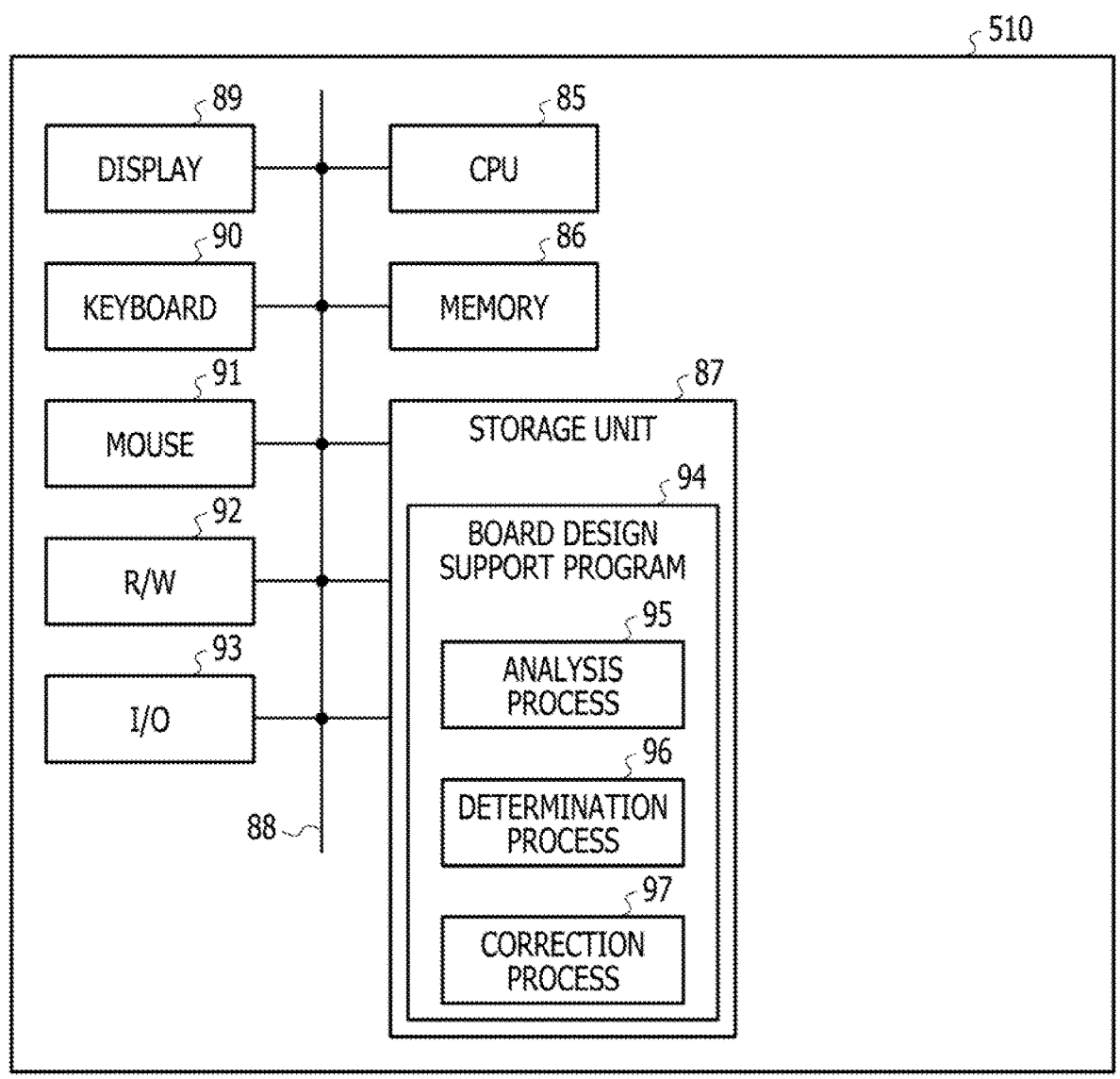
FIG. 15 is a block diagram when a board design support apparatus is achieved by a computer.

FIG. 15 is a block diagram when the board design support apparatus is achieved by a computer. A computer 510 includes a CPU 85, a memory 86, and a nonvolatile storage unit 87. The CPU 85, the memory 86, and the storage unit 87 are coupled to each other through a bus 88. The computer 510 includes a display 89, a keyboard 90, and a mouse 91 which are also coupled to the bus 88. An interface (I/O) 93 for coupling the computer 510 to a computer network or the like and a device (R/W) 92 into which a storage medium is inserted to read and write data from and to the inserted storage medium are coupled to the bus 88.

The storage unit 87 stores a design support program 94 for causing the computer 510 to function as the board design support apparatus 500. The design support program 94 includes an analysis process 95, a determination process 96, and a correction process 97. The CPU 85 reads out the design support program 94 from the storage unit 87, loads the design support program into the memory 86, and executes the processes of the design support program 94. Thus, the computer 510 operates as the board design support apparatus 500. The CPU 85 operates as the analysis unit 81, the determination unit 82, or the correction unit 83 by executing the analysis process 95, the determination process 96, or the correction process 97.

Figure 16:
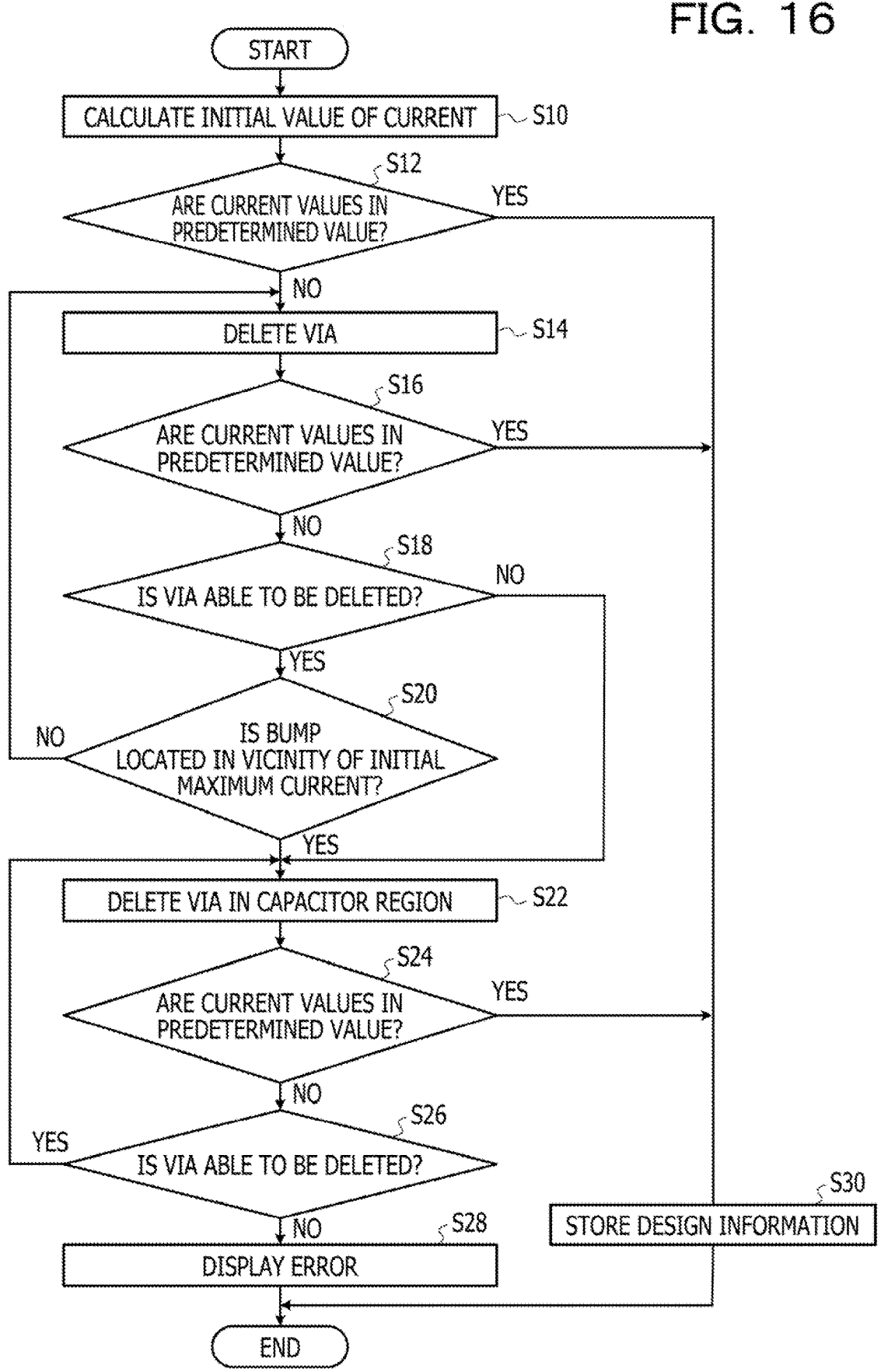
FIG. 16 is a flowchart illustrating an example of a method for supporting a design of the package board.

FIG. 16 is a flowchart illustrating an example of the method for supporting the design of the package board. As illustrated in FIG. 16, the CPU 85 acquires initial design information (layout pattern) of the printed board 10 and the package board 30, and calculates initial values of the currents flowing through the plurality of bumps 70 (step S10). Subsequently, the CPU 85 determines whether or not the current values of the plurality of bumps 70 is within a predetermined value (step S12). The predetermined value may be an allowable current value of the bump 70, for example, a current value that is a threshold value for determining whether or not disconnection occurs in the bump 70. The predetermined value is stored, for example, in the storage unit 87.

When the current values of the plurality of bumps 70 fall within the predetermined value (Yes in step S12), the CPU 85 stores the design information of the package board 30 as current design information (in this example, initial design information) in the storage unit 87 (step S30). Thereafter, the processing is terminated. When there is the bump 70 having the current value exceeding the predetermined value (No in step S12), the via 36 in contact with at least one of the ground pad 38a and the power source pad 38b to which the bump 70 having the current value exceeding the predetermined value is coupled is deleted (step S14), For example, the via 36 in contact with the ground pad 38a or the power source pad 38b to which the bump 70 having the maximum current value is coupled is deleted.

Subsequently, the CPU 85 calculates the current values of the plurality of bumps 70 and determines whether or not the current values fall within the predetermined value (step S16). When the current values fall within the predetermined value (Yes in step S16), the CPU 85 stores the design information of the package board 30 as the current design information in the storage unit 87 (step S30). Thereafter, the processing is terminated. When there is the bump 70 having the current value exceeding the predetermined value (No in step S16), the processing proceeds to step S18. In step S18, the CPU 85 determines whether or not the via 36 in contact with the ground pad 38a adjacent to the ground pad 38a from which the via 36 is deleted or the power source pad 38b adjacent to the power source pad 38b from which the via 36 is deleted is able to be deleted (step S18). A case where the via 36 is not able to be deleted is, for example, a case where there is no adjacent ground pad 38a or power source pad 38b. A case where there is the adjacent pad may be a case where there is the adjacent pad in the column 46 in FIG. 3, and may be a case where there is an adjacent pad on one side or there are adjacent pads on both sides.

When the via 36 is not able to be deleted (No in step S18), the processing proceeds to step S22. When the via 36 is able to be deleted (Yes in step S18), the CPU 85 determines whether or not the bump 70 having the maximum current value calculated in step S16 is the bump located in the vicinity of the bump 70 having the maximum current value calculated in step S10 (step S20). A case where the bump is located in the vicinity includes, for example, a case where the bump is located adjacent to each other by one or two. When the bump 70 is not the bump located in the vicinity (NO in step S20), the CPU 85 returns the processing to step S14, and deletes the via 36 in contact with the ground pad 38a adjacent to the ground pad 38a from which the via 36 is deleted or the power source pad 38b adjacent to the power source pad 38b from which the via 36 is deleted. When the bump 70 is the bump located in the vicinity (Yes in step S20), since it is difficult to decrease the maximum current value even though the via 36 in contact with the adjacent ground pad 38a or the adjacent power source pad 38b is deleted, the processing proceeds to step S22.

In step S22, the CPU 85 deletes the via 36 over the wiring layer 34 provided in the capacitor region 42 inside the ground pad 38a or the power source pad 38b (step S22). For example, in an initial stage, the via 36 in a region adjacent to the ground pad 38a or the power source pad 38b to which the bump 70 having the maximum current value calculated in step S10 is coupled in the wiring layer 34 provided in the capacitor region 42 is deleted. When the processing returns from step S26 to be described later, the via 36 located adjacent to the deleted via 36 in the direction along the column 46 is deleted. For example, the region 48 of the wiring layer 34 provided in the capacitor region 42 which is not in contact with the via 36 is expanded from the central portion to the ends of the side of the outline of the capacitor region 42.

Subsequently, the CPU 85 calculates the current values of the plurality of bumps 70 and determines whether or not the current values fall within the predetermined value (step S24). When the current values fall within the predetermined value (Yes in step S24), the CPU 85 stores the design information of the package board 30 as the current design information in the storage unit 87 (step S30). Thereafter, the processing is terminated.

On the other hand, when there is the bump 70 of which the current value exceeds the predetermined value (No in step S24), the CPU 85 determines whether or not the via 36 over the wiring layer 34 provided in the capacitor region 42 is able to be further deleted (step S26). The determination of whether or not the via 36 is able to be further deleted is performed depending on, for example, whether or not there is the via 36 in a region in which it is effective to decrease the maximum current value as described in Embodiment 3, or the like. When the via 36 is able to be deleted (Yes in step S26), the CPU 85 returns the processing to step S22 and repeats step S22 to step S26. When the via 36 is not able to be deleted (No in step S26), the CPU 85 displays an error on the display 89 (step S28), and terminates the processing.

Although a case where the via 36 in contact with the ground pad 38a or the power source pad 38b is deleted in step S14 has been described as an example in FIG. 16, the total area of the via 36 in contact with the ground pad 38a or the power source pad 38b may be reduced.

According to Embodiment as illustrated in FIG. 16, magnitudes of the currents flowing through the plurality of bumps 70 are obtained (step S10). When there is the bump 70 of which the current value exceeds the predetermined value, the design information of the package board 30 is corrected such that the magnitudes of the currents are within the predetermined value by decreasing the total area of the ground pad 38a or the power source pad 38b in contact with the via 36 to which the bump 70 exceeding the predetermined value is coupled (steps S14, S16, and S30). Accordingly, the concentration of the currents on some bumps 70 may be relaxed.

As illustrated in FIG. 16, even though the total area of the ground pad 38a and the power source pad 38b in contact with the via 36 decreases, the current value may not be within the predetermined value (No in step S16). In this case, it is preferable that the design information of the package board 30 is corrected such that the current value is within the predetermined value by deleting the via 36 in contact with the wiring layer 34 provided in the capacitor region 42 (steps S22, S24, and S30). Accordingly, the concentration of the currents on some bumps 70 may be relaxed.

Although a case where the method for supporting the design of the package board 30 in the flowchart of FIG. 16 is achieved by the computer 510 has been described as an example in Embodiment 5, the present disclosure is not limited thereto. Various improvements and modifications may be made without departing from the gist described above. Although a case where the program is stored in the storage unit 87 in advance has been described as an example, the present disclosure is not limited thereto, and the program may be provided in a form of being stored in a storage medium such as a compact disc read-only memory (CD-ROM) or a Digital Versatile Disc (DVD)-ROM.

Although the embodiments of the present invention have been described in detail above, the present invention is not limited to such specific embodiments, and various modifications and changes may be made within the scope of the gist of the present invention described in the claims.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:
1. An electronic device comprising:
   a board that includes an insulating film, a wiring layer and a via provided in the insulating film, and a plurality of power source pads and a plurality of ground pads which are provided in the insulating film so as to surround a capacitor region in which a capacitor is provided and to which a plurality of bumps is coupled; and
   an electronic component that is mounted at the board, and is electrically coupled to the plurality of power source pads and the plurality of ground pads through the wiring layer and the via, at least one of
a case where the plurality of power source pads includes one or a plurality of first power source pads with which the via is in contact and one or a plurality of second power source pads with which the via is not in contact in a column lined up along a side of an outline of the capacitor region so as to be adjacent to the capacitor region and
a case where the plurality of ground pads includes one or a plurality of first ground pads with which the via is in contact and one or a plurality of second ground pads with which the via is not in contact in the column lined up along the side of the outline of the capacitor region so as to be adjacent to the capacitor region is satisfied,
the board includes the wiring layer electrically coupled to the one or plurality of second power source pads and the one or plurality of second ground pads in the capacitor region surrounded by the plurality of power source pads and the plurality of ground pads, and the wiring layer provided in the capacitor region is not in contact with the via in at least a partial region of regions adjacent to the column.

2. The electronic device according to claim 1, wherein at least one of the one or plurality of second power source pads and the one or plurality of second ground pads is not in contact with the via.

3. The electronic device according to claim 1, wherein at least one of the one or plurality of second power source pads and the one or plurality of second ground pads is arranged in a central portion of the side of the outline of the capacitor region, and is not arranged at ends of the side.

4. The electronic device according to claim 1, wherein at least one of the one or plurality of second power source pads and the one or plurality of second ground pads is arranged from one end to the other end of the side of the outline of the capacitor region.

5. The electronic device according to claim 1, wherein at least one of the one or plurality of second power source pads and the one or plurality of second ground pads is arranged so as to surround the capacitor region.

6. The electronic device according to claim 1, wherein a length of the at least a partial region in a direction along the column is longer than lengths of one power source pad of the plurality of power source pads and one ground pad of the plurality of ground pads in the direction along the column.

7. The electronic device according to claim 1, wherein a width of the at least a partial region in a direction intersecting the direction along the column is wider than 0 mm and equal to or narrower than 3.0 mm.

8. The electronic device according to claim 1, wherein the at least a partial region is located so as to include a central portion of the side of the outline of the capacitor region.

9. An electronic apparatus comprising:
a first board;
a second board that includes an insulating film, a wiring layer and a via provided in the insulating film, and a plurality of power source pads and a plurality of ground pads provided in the insulating film so as to surround a capacitor region in which a capacitor is provided, and is mounted at the first board by a plurality of bumps being coupled to the plurality of power source pads and the plurality of ground pads; and
an electronic component that is mounted at the second board, and is electrically coupled to the plurality of power source pads and the plurality of ground pads through the wiring layer and the via,
wherein at least one of a case where the plurality of power source pads includes one or a plurality of first power source pads with which the via is in contact and one or a plurality of second power source pads with which the via is not in contact in a column lined up along a side of an outline of the capacitor region so as to be adjacent to the capacitor region and
a case where the plurality of ground pads includes one or a plurality of first ground pads with which the via is in contact and one or a plurality of second ground pads with which the via is not in contact in the column lined up along the side of the outline of the capacitor region so as to be adjacent to the capacitor region is satisfied,
the board includes the wiring layer electrically coupled to the one or plurality of second power source pads and the one or plurality of second ground pads in the capacitor region surrounded by the plurality of power source pads and the plurality of ground pads, and the wiring layer provided in the capacitor region is not in contact with the via in at least a partial region of regions adjacent to the column.

10. A method of supporting a design of an electronic device that includes a board, which includes an insulating film, a wiring layer and a via provided in the insulating film, and a plurality of power source pads and a plurality of ground pads which are provided in the insulating film so as to surround a capacitor region in which a capacitor is provided and to which a plurality of bumps is coupled, and an electronic component which is mounted at the board and is electrically coupled to the plurality of power source pads and the plurality of ground pads through the wiring layer and the via, the method comprising:
by using a computer, obtaining magnitudes of currents flowing through the plurality of bumps; and
correcting, when there is the bump of which the magnitude of the current exceeds a predetermined value among the plurality of bumps, design information of the board such that the magnitudes of the currents flowing through the plurality of bumps are in the predetermined value by decreasing a number of at least one of the power source pad and the ground pad to which the bump exceeding the predetermined value is coupled and which are in contact with the via among the plurality of power source pads and the plurality of ground pads,
the board includes the wiring layer electrically coupled to the one or plurality of second power source pads and the one or plurality of second ground pads in the capacitor region surrounded by the plurality of power source pads and the plurality of wound pads, and the wiring layer provided in the capacitor region is not in contact with the via in at least a partial region of regions adjacent to the column.

\* \* \* \* \*